May 19, 1931.  M. E. DAVIS  1,805,688
METHOD AND MACHINE FOR RECLAIMING RUBBER AND FABRIC FROM TIRE BEADS
Filed Jan. 10, 1929    3 Sheets-Sheet 1

Witness:

INVENTOR.
Maurice E. Davis.
BY
ATTORNEYS.

May 19, 1931. M. E. DAVIS 1,805,688
METHOD AND MACHINE FOR RECLAIMING RUBBER AND FABRIC FROM TIRE BEADS
Filed Jan. 10, 1929 3 Sheets-Sheet 2

Witness:
G. E. Redding

INVENTOR.
Maurice E. Davis.
BY Rice Rice & Mann
ATTORNEYS.

May 19, 1931. M. E. DAVIS 1,805,688
METHOD AND MACHINE FOR RECLAIMING RUBBER AND FABRIC FROM TIRE BEADS
Filed Jan. 10, 1929 3 Sheets-Sheet 3

INVENTOR.
Maurice E. Davis.
BY Rice Rice & Hann
ATTORNEYS

Witness:

Patented May 19, 1931

1,805,688

UNITED STATES PATENT OFFICE

MAURICE E. DAVIS, OF GRAND RAPIDS, MICHIGAN, ASSIGNOR, BY MESNE ASSIGN-MENTS, TO LEO MEYER COMPANY, OF AKRON, OHIO, A CORPORATION OF OHIO

METHOD AND MACHINE FOR RECLAIMING RUBBER AND FABRIC FROM TIRE BEADS

Application filed January 10, 1929. Serial No. 331,651.

This invention relates to method and means for reclaiming or recovering the rubber and fabric of an automobile tire bead.

The main objects of this invention are to provide an improved method of slicing strips of rubber and fabric from around the wire core ordinarily present in a tire bead; to provide an improved machine for cutting or slicing the strips of rubber and fabric from the bead; and generally, to provide an improved method and means which will effect a considerable economic saving by way of reclaiming or recovering what at present is an economic waste.

An illustrative embodiment of this invention is shown in the accompanying drawings, in which.

Figure 1:
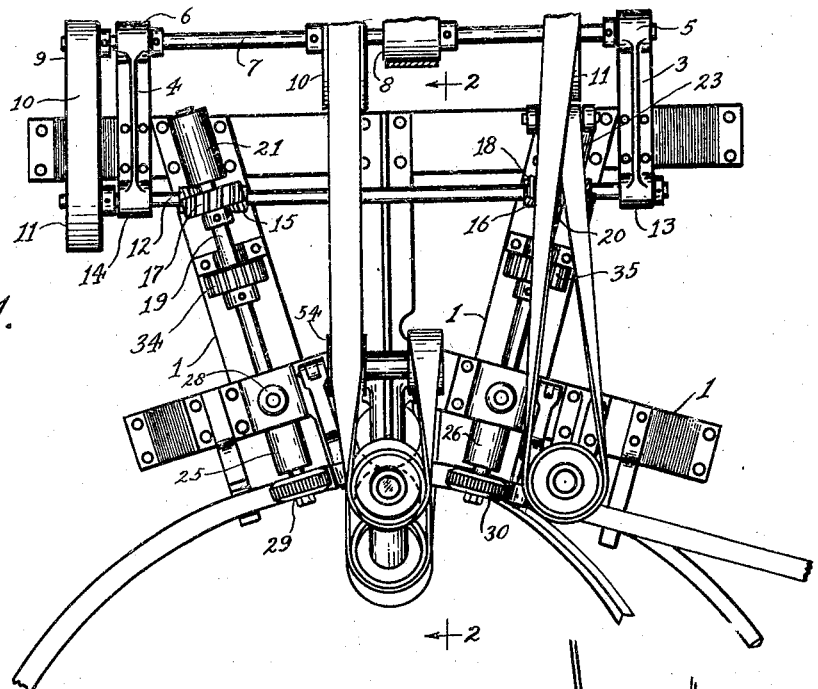
Fig. 1 is a top plan view of the machine.
Figure 2:
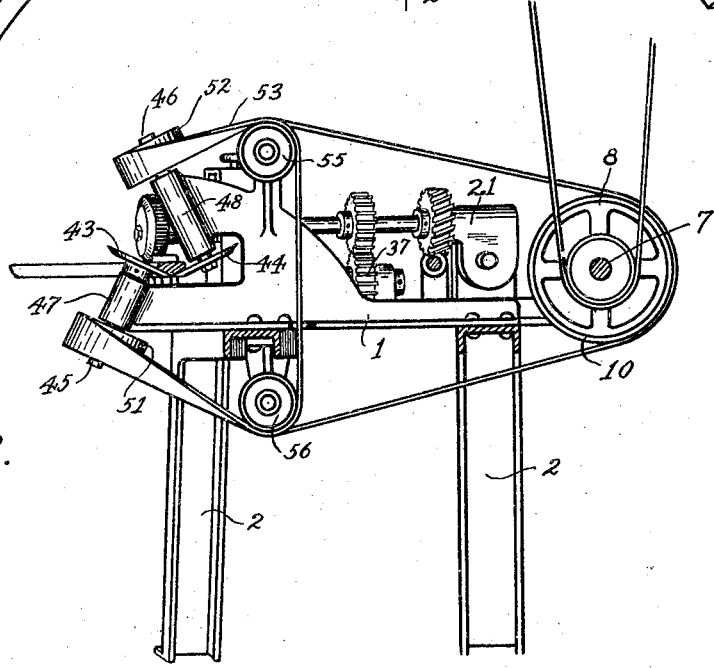
Fig. 2 is a sectional view taken on the line 2—2 of Fig. 1.
Figure 3:
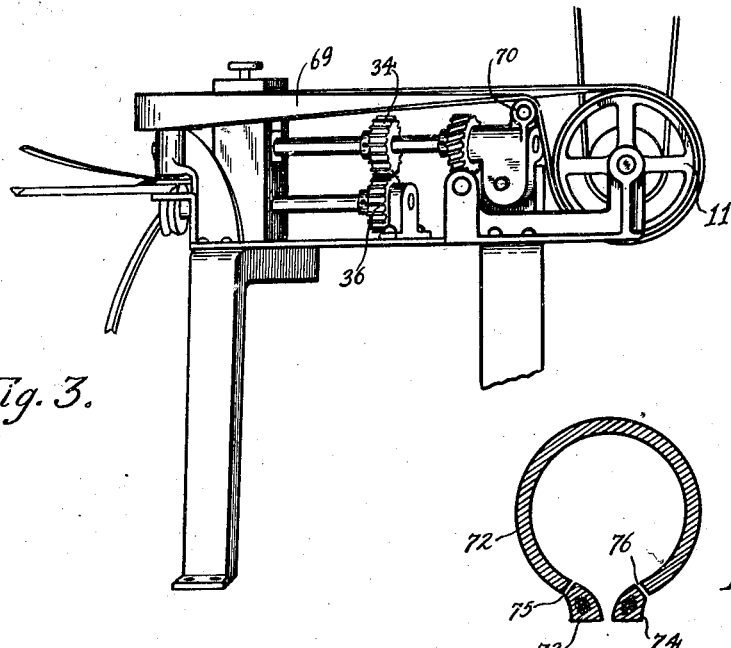
Fig. 3 is a fragmentary view in elevation taken from the right side of Fig. 1.

At the present time millions of tires are being salvaged each year for the purpose of reusing the rubber and fabric therein. It is customary at present to cut the bead from the remainder of the tire casing as this bead contains a stranded wire cable and such bead, after being severed from the tire, is discarded. At some of the large rubber plants where a considerable number of salvaged tires are being reclaimed these discarded beads are burned in large fires in order to get rid of them.

On the average, the weight of the two beads is approximately 20 per cent of the weight of the entire casing and as the stranded wire cable within the bead occupies only a portion thereof, the fabric and rubber surrounding the wire cable is discarded with the bead. By weight, a bead is approximately 50 per cent rubber and fabric. From this it is apparent that the discarding and burning up of tire beads causes a very large economic waste.

Attempts have been made to salvage the rubber and fabric of tire beads. One attempted method was by boiling and soaking the beads in vats and tanks until the rubber and fabric became sufficiently loosened from the wire core so that it could be stripped therefrom by hand. This method was not only very laborious but also the cost of recovering by such method was greater than the value of the recovered product, except in such instances as where prison labor or the like was uesd.

Another attempted method has been by crushing the rubber and fabric from the wire core by use of high pressure. This method also proved to be impractical and at the present time no practical solution of this problem has been made.

After a considerable amount of study devoted to this subject, I have discovered that a practical method of reclaiming this rubber and fabric is to sever the tire beads transversely after they have been removed from the casing and then pass them endwise or lengthwise into a machine which is provided with feeding rollers, positioning holders, and rapidly rotating disc cutters. The cutters are so arranged that they will slice strips from the wire core, knives being so positioned that from three-fourths to nine-tenths of a pound of rubber and fabric is recovered on the average from each tire bead.

The machine for carrying out this method comprises a frame 1 supported by legs 2 which may be riveted or bolted thereto. The rear portion of the framework 1 is provided with brackets 3 and 4 which have bearings 5 and 6 in which is journalled a countershaft 7. The countershaft 7 has a power drive pulley 8 keyed thereto and belt pulleys 9, 10 and 11 keyed thereto at spaced intervals. The belt pulley 9 is provided with a belt 10 which drives a pulley wheel 11 rigidly secured to one end of a countershaft 12 which is journalled in bearings 13 and 14 which are also carried by the brackets 3 and 4 respectively. The countershaft 12 carries worms 15 and 16 keyed thereto which drive worm gears 17 and 18 respectively. The gears 17 and 18 are keyed to shafts 19 and 20 respectively.

Figure 4:
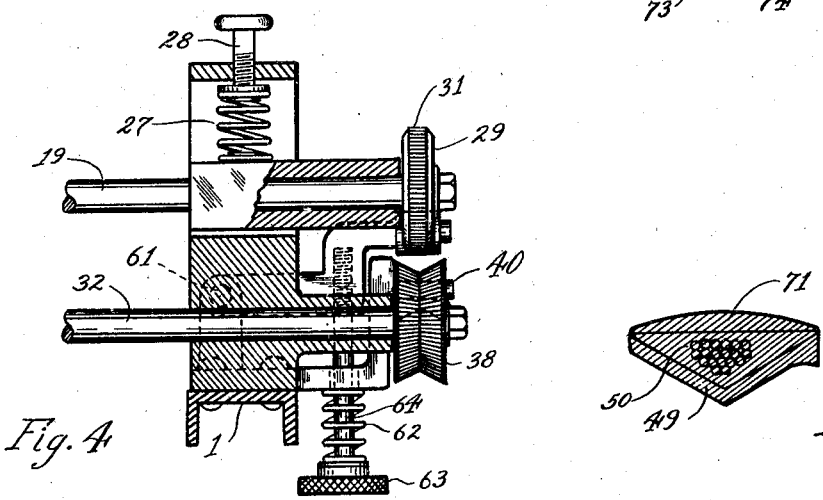
Fig. 4 is an enlarged fragmentary sectional detail, showing the first pair of feeding rollers.

The shaft 19 is journalled in bearings 21 carried on the frame 1 and the shaft 20 is journalled in bearings 23 also carried on the frame 1. The shafts 19 and 20 extend forwardly at a converging angle, as shown most clearly in Fig. 1 of the drawings, and the forward ends of said shafts are journalled in bearings 25 and 26 which are vertically movable in their supporting framework, as shown most clearly in Fig. 4. A helical compression spring 27, provided with an adjusting screw 28, is provided for normally holding the bearing downwardly in its framework. The extreme ends of the shafts 19 and 20 are provided with feed rollers 29 and 30 which have serrated faces 31 and 32 respectively for gripping the bead as it is passed into the machine.

Journalled in the framework immediately below each of the shafts 19 and 20 are countershafts 32 and 33 which are substantially parallel with the shafts 19 and 20 and driven by spur gears 34 and 35 which mesh with similar gears 36 and 37 secured to the countershafts 32 and 33 respectively. The outer ends of the shafts 32 and 33 are provided with feed rollers 38 and 39 which have V-shaped grooves in their faces and said faces are serrated in the same manner as the upper feed rollers 29 and 30 with which they cooperate.

After the tire bead has been transversely severed, it is fed endwise or lengthwise to the first set of cooperating feed rollers 29 and 38 from which it passes to a supporting roller 40 rigidly mounted on the frame 1. A holddown roller 41 is journalled on a shaft 42 immediately above the roller 40 so as to cooperate therewith and hold the bead in definite position. As the bead passes from the holding roller 40 it is engaged by a pair of cutter discs 43 and 44 which are rigidly secured to one end of shafts 45 and 46 respectively. The shafts 45 and 46 are journalled in bearings 47 and 48 carried by the frame 1 and are so positioned that the cutter discs rotate in planes transversely to each other with their adjacent edges close together and at an angle so that they will sever a V-shaped strip 49 from the core 50. The opposite ends of the shafts 45 and 46 are provided with belt pulleys 51 and 52 which receive a drive belt 53. The belt 53 is driven by the belt pulley 10 on countershaft 7 and passes forwardly over an idler pulley 54, thence around the pulley 52, rearwardly over an idler 55, downwardly around an idler 56, forwardly around the pulley 51, thence rearwardly over an idler 57, back to the drive pulley 10.

After the V-shaped strip 49 has been severed from the core, the remainder of the bead passes to the set of feed rollers 30 and 39 and from there to a second positioner comprising a roller 58 above which is journalled another roller 59 on a bracket arm 60, the rear end of which is pivotally mounted at 61 to the frame 1 and yieldingly urged downwardly against the positioning roller 58 by a helical compression spring 62 which bears between the frame and the knurled head 63 of an adjusting stud 64 which slidably passes through the frame and threadably engages the bracket arm 60. As the bead passes from the second positioning means, it is engaged by a second cutter disc 65 which is rigidly secured to the lower end of a shaft 66 journalled in a vertical bearing 67. The upper end of the shaft 66 is provided with a belt pulley 68 which receives a belt 69. The belt 69 extends rearwardly over an idler pulley 70 and thence around the drive pulley 11 on the countershaft 7.

Figure 7:
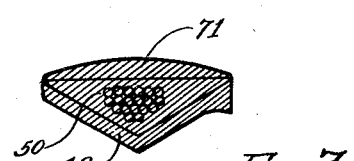
Fig. 7 is an enlarged transverse sectional view of a bead showing the strips which are sliced off of the bead.
Figure 5:
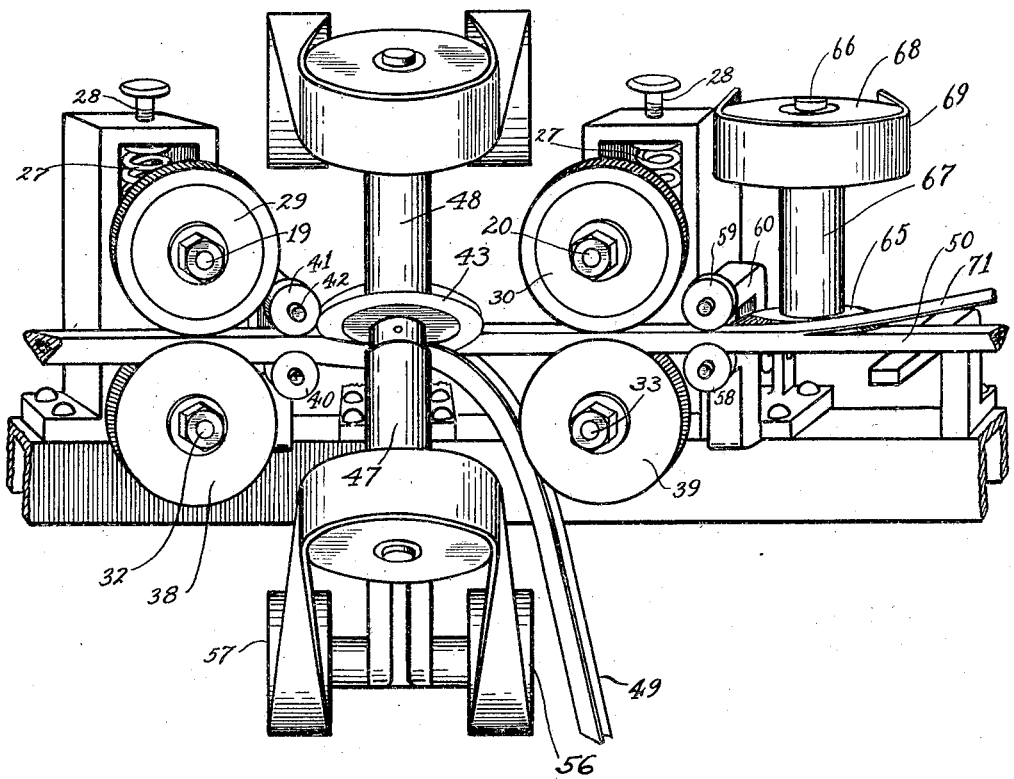
Fig. 5 is an enlarged fragmentary detail taken in elevation from the front of the machine.

The cutter disc 65 is preferably journalled to rotate in a horizontal plane and is so positioned that it will sever or slice a strip 71 from the top side of the bead. The amount of these cuts are substantially shown by the heavy black lines in Fig. 7 of the drawings.

Figure 6:
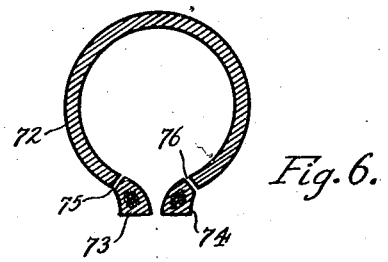
Fig. 6 is a thin sectional view showing how the beads are severed from the remainder of an automobile tire casing.

In Fig. 6 of the drawings is shown a thin section of an automobile casing 72 from which the two beads 73 and 74 have been severed at the points 75 and 76 respectively. This is the customary way in which the beads are cut from casings and in order to feed the bead into my improved machine, the beads are transversely severed so as to have a free end to feed into the machine.

In the operation of this machine, the transversely severed tire beads are passed endwise to the feed rollers 29 and 38, thence to the positioning guide which comprises the roller 40 and roller 41. This holder positions the tire bead so that the cutter discs 43 and 44 will sever a V-shaped strip from the bead without the cutter discs coming in contact with the stranded wire cable core of the bead. Contact of the cutters with such wire core would, of course, ruin the cutters. After the cutters 43 and 44 have severed the V-shaped strip 49 from the bead, the bead passes to the feed rollers 30 and 39 and thence to a second positioning guide which comprises the roller 58 and cooperating hold-down roller 59. As the bead leaves this second positioning guide, it is engaged by the rotating disc cutter knife 65 and the strip 71 is severed from the top side of the bead.

Although but one specific embodiment of this invention has been herein shown and described, it will be understood that numerous details of the construction shown may be altered or omitted without departing from the spirit of this invention as defined by the following claims.

I claim:

1. A machine of the class described comprising a frame, cooperating rollers journalled on said frame for feeding a tire bead lengthwise therethrough, a guide on said frame for positioning the bead after it passes through said feed rollers, and a pair of cooperating rotating disc cutters positioned to rotate in transverse planes for slicing a V-shaped strip from the bead after passing from said guide.

2. A machine of the class described comprising a frame, cooperating rollers journalled on said frame for feeding a tire bead lengthwise therethrough, a guide on said frame for positioning the bead after it passes through said feed rollers, a cutter on said frame for slicing a strip from the bead after it passes from said guide, a second pair of feed rollers journalled on said frame in the path of travel of said bead, a second guide on said frame for positioning the bead after it passes from said second set of feed rollers, and a second cutter on said frame for slicing a strip from said bead after it passes from said second positioning guide.

3. A machine of the class described comprising a frame, cooperating rollers journalled on said frame for feeding a tire bead lengthwise therethrough, a guide on said frame for positioning the bead after it passes through said feed rollers, a pair of cooperating rotating disc cutters positioned to rotate in transverse planes for slicing a V-shaped strip from the bead after passing from said guide, a second pair of feed rollers journalled on said frame in the path of travel of said bead, a second guide on said frame for positioning the bead after passing from said second set of feed rollers, and a second cutter on said frame for slicing a strip from said bead after it passes from said second positioning guide.

4. A machine of the class described comprising a frame, cooperating rollers journalled on said frame for feeding a tire bead lengthwise therethrough, a guide on said frame for positioning the bead after it passes through said feed rollers, a pair of cooperating rotating disc cutters positioned to rotate in transverse planes for slicing a V-shaped strip from the bead after passing from said guide, a second pair of feed rollers journalled on said frame in the path of travel of said bead, a second guide on said frame for positioning the bead after passing from said second set of feed rollers, and a second rotating disc cutter on said frame for slicing a strip from said bead after it passes from said second positioning guide.

5. The method of reclaiming the rubber and fabric from a tire bead, which consists in cutting the bead longitudinally from opposite sides thereof and at an angle to sever from one face of the bead a transversely continuous substantially V-shaped slice having angularly related sides connected integrally at the angle, and then cutting the bead longitudinally at the opposite face thereof to sever a straight slice from the same.

6. The method of reclaiming the rubber and fabric from a tire bead having a wire core, which consists in cutting the bead longitudinally from opposite sides thereof and at an angle to sever from one face of the bead a substantially V-shaped slice, and then cutting the bead longitudinally at the opposite face thereof to sever a straight slice from the same.

In testimony whereof I have hereunto set my hand at Grand Rapids, Michigan, this 29th day of December, 1928.

MAURICE E. DAVIS.